(12) United States Patent
Hoover et al.

(10) Patent No.: US 11,857,085 B2
(45) Date of Patent: Jan. 2, 2024

(54) SINGLE CONTROL CONSOLE MOUNTED ARMREST

(71) Applicant: AMI Industries, Inc., Colorado Springs, CO (US)

(72) Inventors: Douglas E. Hoover, Colorado Springs, CO (US); Jason M. Sharpe, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 206 days.

(21) Appl. No.: 17/462,278

(22) Filed: Aug. 31, 2021

(65) Prior Publication Data

US 2023/0061160 A1    Mar. 2, 2023

(51) Int. Cl.
*A47C 7/54* (2006.01)
*B64D 11/06* (2006.01)

(52) U.S. Cl.
CPC .......... *A47C 7/541* (2018.08); *B64D 11/0644* (2014.12); *B64D 11/0689* (2013.01)

(58) Field of Classification Search
CPC . B60N 2/77; B60N 2/767; G05G 1/62; A61G 5/125
USPC ........................................ 297/411.32, 411.38
See application file for complete search history.

(56) References Cited

U.S. PATENT DOCUMENTS

| | | | |
|---|---|---|---|
| 4,307,913 A | 12/1981 | Spiegelhoff | |
| 4,763,860 A | 8/1988 | Vauvelle et al. | |
| 4,887,866 A * | 12/1989 | Rusin | A47C 1/03 297/411.44 |
| 5,636,899 A * | 6/1997 | Schiff | B60N 2/77 248/118 |
| 8,950,816 B2 | 2/2015 | Ott et al. | |
| 9,144,316 B1 | 9/2015 | Sapir | |
| 9,844,268 B2 * | 12/2017 | DeJule | A47C 1/03 |
| 10,829,202 B2 * | 11/2020 | Haugeberg | B64C 13/0421 |
| 10,879,489 B2 * | 12/2020 | Choi | H10K 71/00 |
| 11,084,407 B2 * | 8/2021 | Keller | B60N 2/938 |
| 11,459,109 B2 * | 10/2022 | Hoover | B64D 11/0644 |
| 11,618,572 B2 * | 4/2023 | Rao | A47C 7/541 297/411.2 |
| 2003/0034680 A1 | 2/2003 | Stumpf et al. | |
| 2007/0096531 A1 | 5/2007 | Bruns et al. | |
| 2011/0049960 A1 * | 3/2011 | Ferguson | B64C 11/065 403/109.1 |
| 2019/0071184 A1 | 3/2019 | Haugeberg | |
| 2019/0351799 A1 | 11/2019 | Kim et al. | |
| 2020/0240109 A1 | 7/2020 | Wallgren et al. | |

FOREIGN PATENT DOCUMENTS

| | | |
|---|---|---|
| DE | 102006053329 A1 | 5/2007 |
| FR | 2770468 A1 | 5/1999 |
| GB | 2068719 A | 8/1981 |

* cited by examiner

*Primary Examiner* — Sarah B McPartlin
(74) *Attorney, Agent, or Firm* — Suiter Swantz pc llo

(57) ABSTRACT

A console mounted armrest includes an adjustable post to raise and lower the armrest, and a linkage. The linkage defines the tilt of the armrest with respect to the post. A single control mechanism controls the motion of the post, and thereby also controls the tilt of the armrest to maintain a desirable orientation with respect to the sidestick. The control mechanism defines multiple positive lock-out positions with respect to the post such that the control mechanism will always engage one of the positive lock-out positions.

18 Claims, 6 Drawing Sheets

SINGLE CONTROL CONSOLE MOUNTED ARMREST

BACKGROUND

In many aircraft, a pilot's seating position is defined by a desirable line of sight such that the pilot's head is in substantially the same location within the cockpit regardless of the pilot's size. However, aircraft controls, particularly sidestick controls, are in a fixed location such that relation between the pilot's arm and sidestick control may be substantially different depending on the size of the pilot.

Existing console mounted armrests require multiple points of adjustment to comfortably accommodate differently sized pilots. Multiple points of adjustment create clutter, confusion, and added complexity.

SUMMARY

In one aspect, embodiments of the inventive concepts disclosed herein are directed to a console mounted armrest having an adjustable post to raise and lower the armrest, and a linkage. The linkage defines the tilt of the armrest with respect to the post. A single control mechanism controls the motion of the post, and thereby also controls the tilt of the armrest to maintain a desirable orientation with respect to the sidestick.

In a further aspect, the control mechanism defines multiple positive lock-out positions with respect to the post such that the control mechanism will always engage one of the positive lock-out positions.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
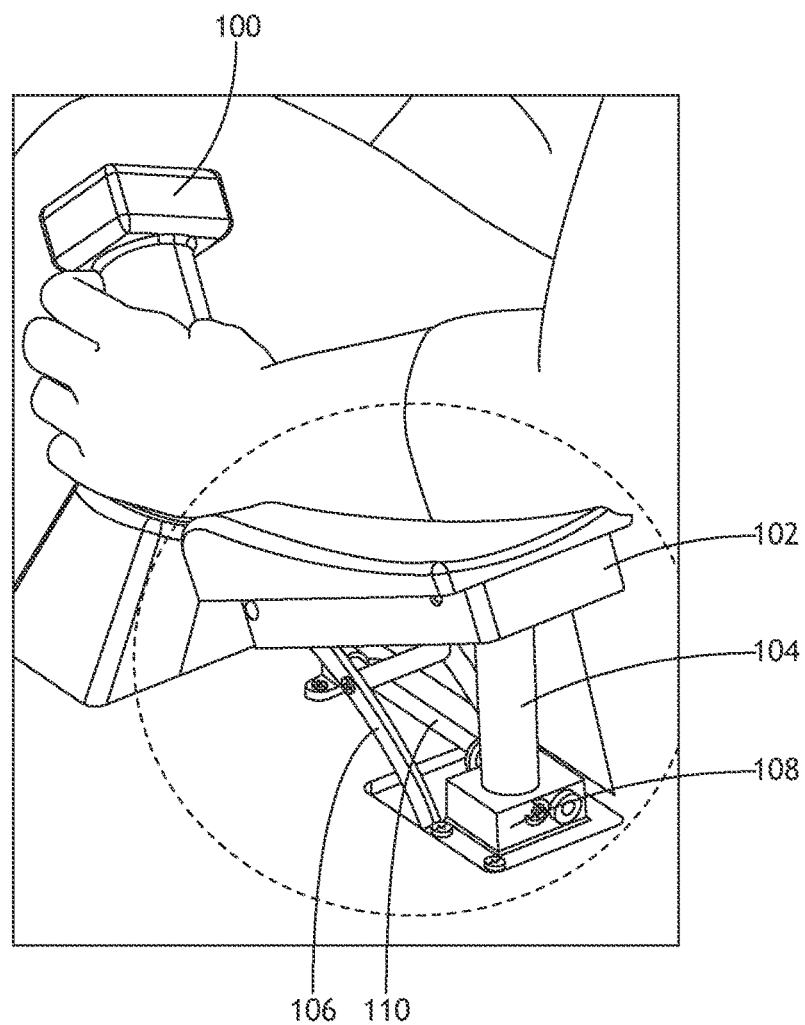
FIG. 1 shows an environmental view of a console mounted armrest according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a console mounted armrest having an adjustable post to raise and lower the armrest, and a linkage. The linkage defines the tilt of the armrest with respect to the post. A single control mechanism controls the motion of the post, and thereby also controls the tilt of the armrest to maintain a desirable orientation with respect to the sidestick. The control mechanism defines multiple positive lock-out positions with respect to the post such that the control mechanism will always engage one of the positive lock-out positions.

Referring to FIG. 1, an environmental view of a console mounted armrest according to an exemplary embodiment is shown. The console mounted armrest includes an arm pad deck 102 connected to a locking mechanism 108 view a vertically displaceable post 104. The post 104 moves up and down at the discretion of the user to maintain the arm pad deck 102 in a desired orientation with respect to a sidestick 100 or other such control element. As the post 104 moves up and down, a linkage 106 connected to the arm pad deck 102 alters the tilt of the arm pad deck 102 to maintain the orientation. The linkage 106 defines the tilt with respect to the linear vertical displacement of the post 104.

Because the tilt and vertical displacement are related, both may be controlled by the locking mechanism 108. A single control element 110 allows the user to adjust both the height and tilt of the armrest.

Figure 2:
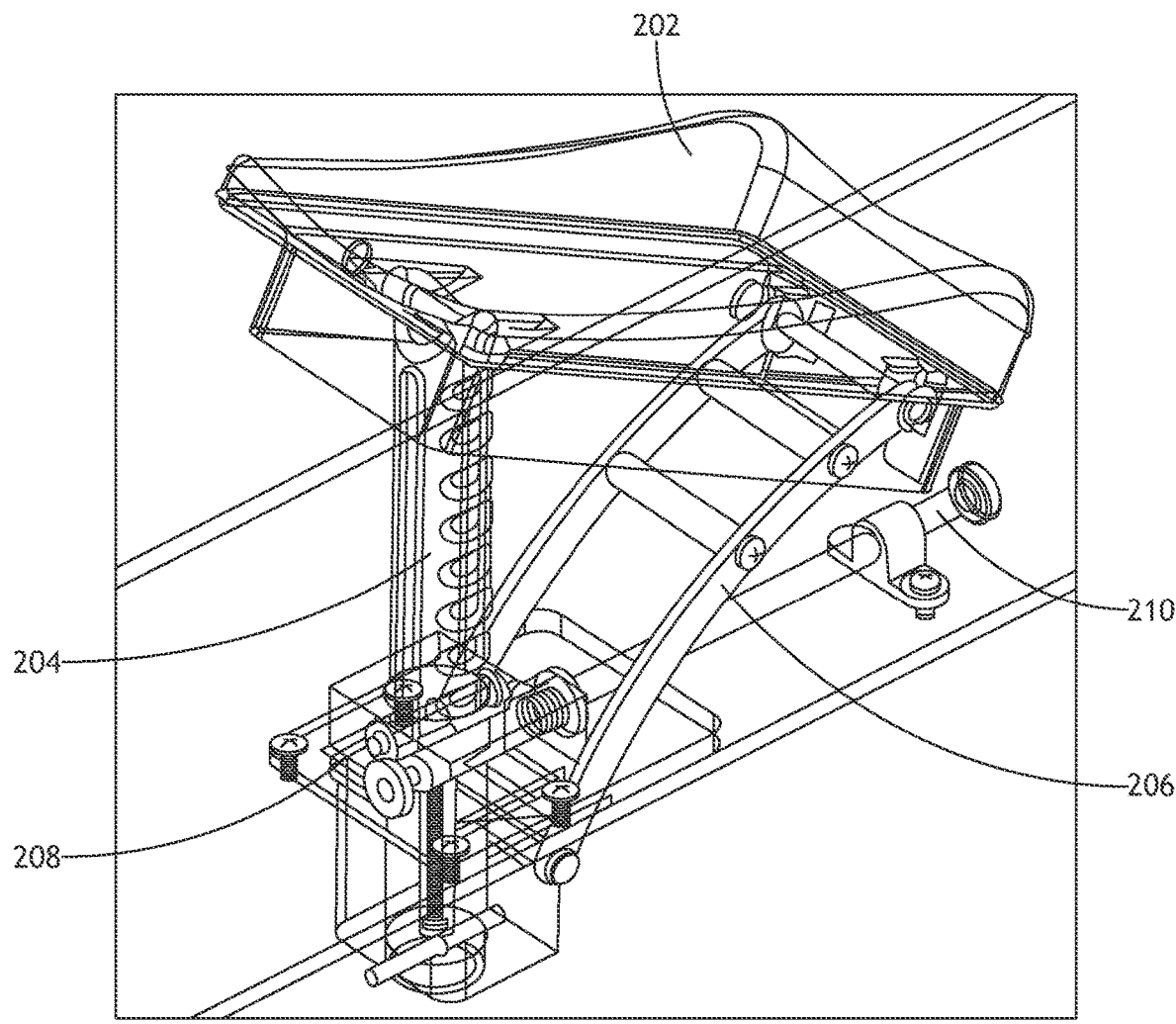
FIG. 2 shows a perspective view of a console mounted armrest according to an exemplary embodiment.

Referring to FIG. 2, a perspective view of a console mounted armrest according to an exemplary embodiment is shown. An arm pad deck (and corresponding arm pad) 202 is pivotably connected to a post 204, disposed at a posterior portion of the arm pad deck 202; the post 204 may be raised and lowered. A linkage 206 connects an anterior portion of the arm pad deck 202 to a locking mechanism 208 or a portion of a corresponding armrest proximal to the locking mechanism 208.

As the post 204 is raised and lowered, the linkage 206 causes the arm pad deck 202 to tilt. The shape of the linkage 206 and the points of connection between the linkage 206 and the armrest or locking mechanism 208 define the relationship between the linear displacement of the post 204 and magnitude of tilt.

In at least one embodiment, a single control element 210 actuates the locking mechanism 208 to set the linear displacement of the post 204, and thereby the tilt of the arm pad deck 202. The single control element 210 may comprise an extended rod to allow the user to actuate the locking mechanism 208 while the user's arm is on the arm pad deck 202.

Figure 3:
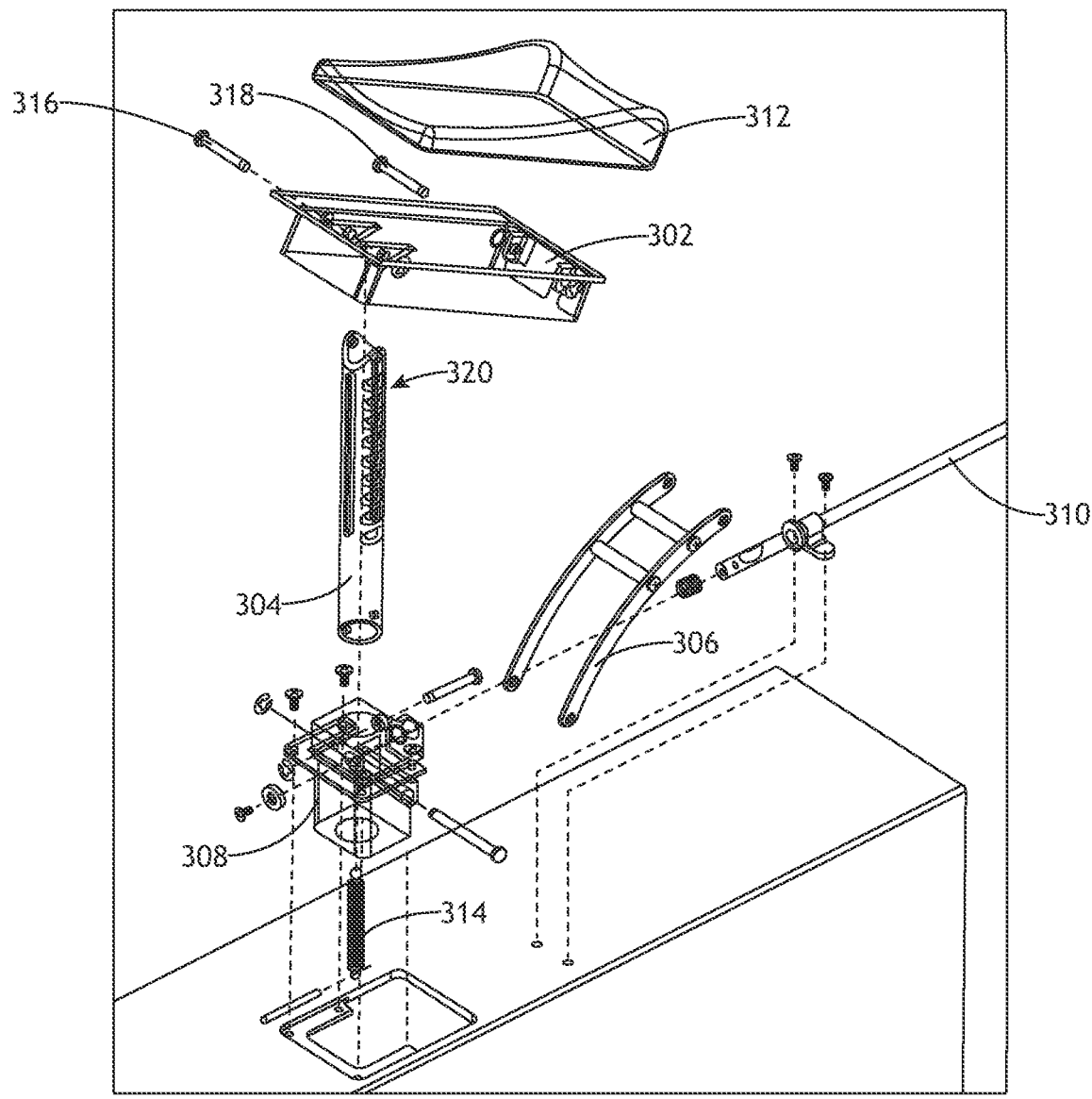
FIG. 3 shows a perspective, exploded view of a console mounted armrest according to an exemplary embodiment.

Referring to FIG. 3, a perspective, exploded view of a console mounted armrest according to an exemplary embodiment is shown. An arm pad deck 302 is pivotably connected to a post 304 at a posterior portion via a post connection pin 316 and pivotably connected to a linkage 306 at an anterior portion via linkage connection pin 318. A locking mechanism 308 controls the linear displacement of the post 304. The locking mechanism 308 is actuated by a single control element 310. The single control element 310 may comprise a rod that engages one of a plurality of post grooves 320 defined by the post 304. Each of the plurality of post grooves 320 defines a fixed position of the post 304 and corresponding tilt of the arm pad deck 302 to maintain a relationship between an arm pad 312 and control such as a side stick control.

In at least one embodiment, a post spring 314 biases the post 304 upward. In such embodiment, when the single control element 310 is actuated, the post 304 is released to travel up toward a user's arm. The user may then apply a downward force to the arm pad 312 to arrive at the desired position.

Figure 4A:
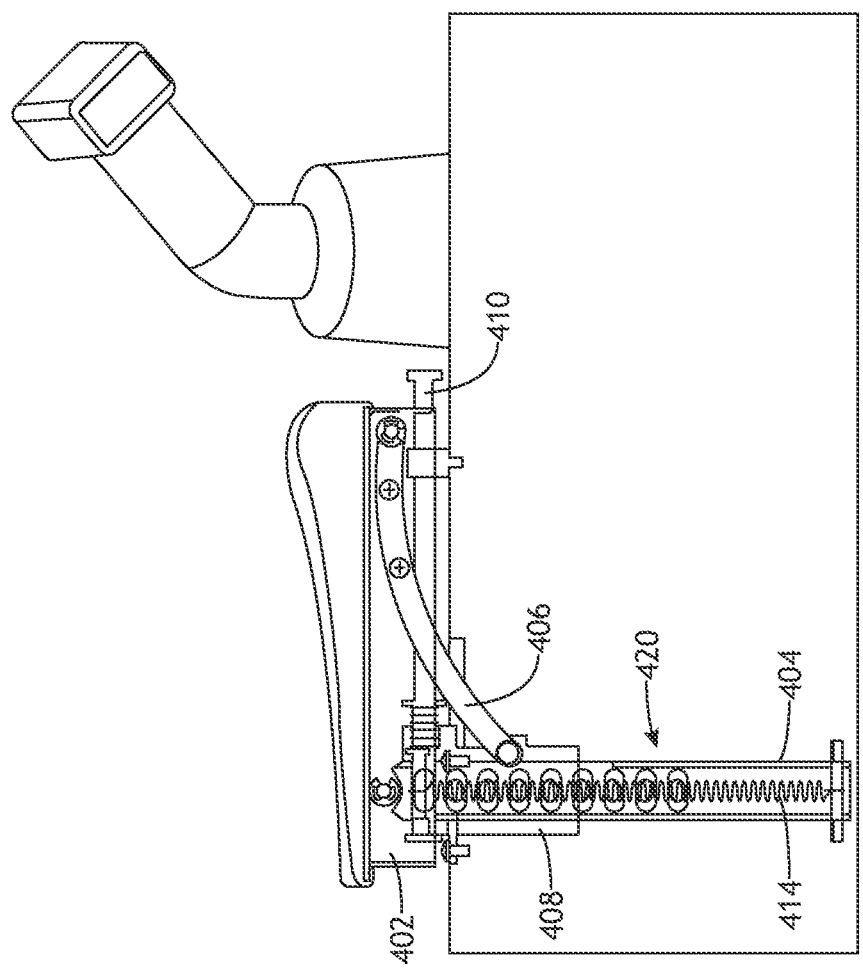
FIG. 4A shows a side view of a console mounted armrest according to an exemplary embodiment.
Figure 4B:
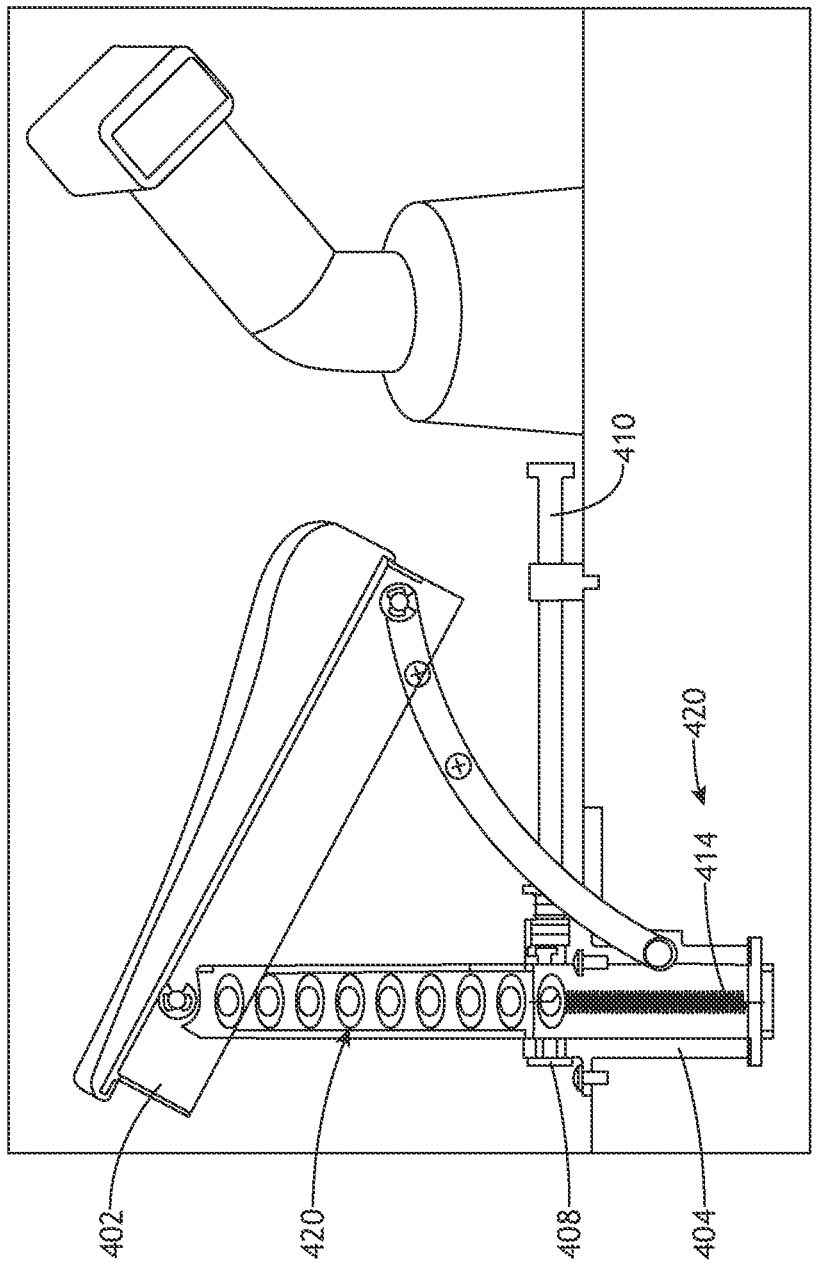
FIG. 4B shows a side view of a console mounted armrest according to an exemplary embodiment.

Referring to FIGS. 4A-4B, side views of a console mounted armrest according to an exemplary embodiment are shown. In a fully retracted orientation (such as in FIG. 4A), a post 404 connected to an arm pad deck 402 is fully retracted within the armrest and held in place via a locking mechanism 408 having a single control element 410 that engages a post groove 420 defined by the post 404. In at least one embodiment, a post spring 414 configured to bias the post 404 upward is in a state of maximum extension. A linkage 406 connecting the arm pad deck 402 to the locking mechanism 408 controls the tilt of the arm pad deck 402 to rest flush with the armrest.

In a fully extended orientation (such as in FIG. 4B), the post 404 is fully extended, with a portion of the post 404 within the locking mechanism 408 and held in position via the single control element 410 engaging a different post groove 420 defined by the post 404. In at least one embodiment, the post spring 414 is in a state of minimum extension. The linkage 406 connecting the arm pad deck 402 to the locking mechanism 408 controls the tilt of the arm pad deck 402 to maintain a relationship between the arm pad deck 402 and a corresponding control.

Figure 5A:
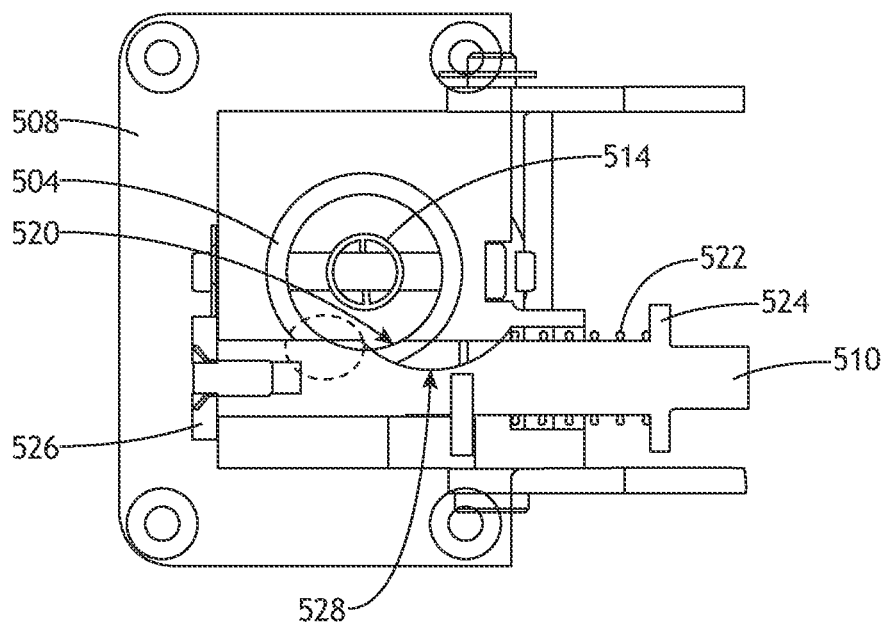
FIG. 5A shows a top, detail view of a locking mechanism according to an exemplary embodiment.
Figure 5B:
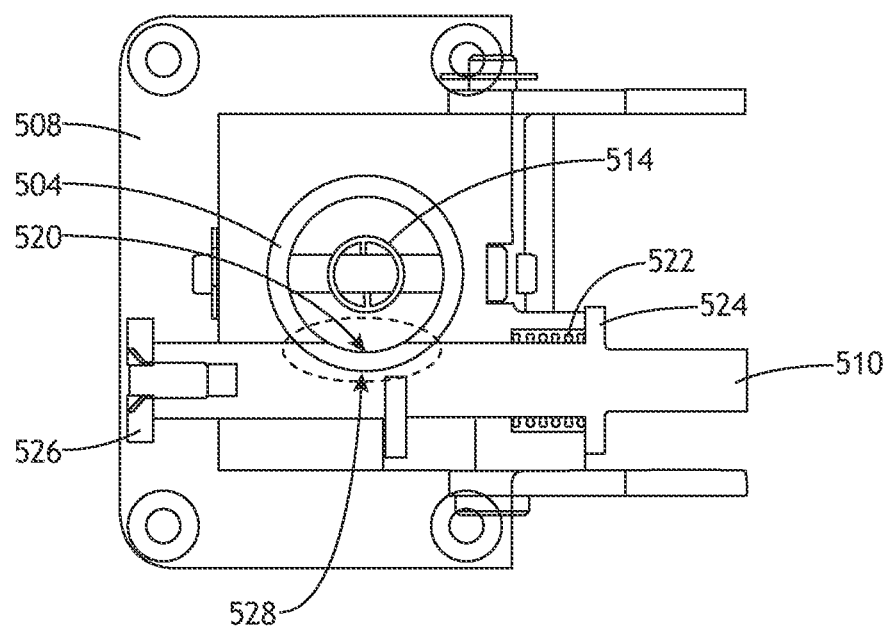
FIG. 5B shows a top, detail view of a locking mechanism according to an exemplary embodiment.

Referring to FIGS. 5A-5B, top, detail views of a locking mechanism 508 according to an exemplary embodiment are shown. The locking mechanism 508 defines a shaft to accommodate and guide post 504. The post 504 defines a plurality of post grooves 520; the post grooves 520 configured to engage a control element 510. Furthermore, the control element 510 defines a control groove 528.

In at least one embodiment, the control element 510 includes stops 524, 526 that define engaged and disengaged states of the locking mechanism 508. In at least one embodiment, a control element spring 522 biases the control element 510 toward the engaged state.

When engaged (such as in FIG. 5A), a portion of the control element 510 is coincident with one of the post grooves 520. The post 504 is held in a fixed position defined by the post groove 520, which also control the tilt of an arm pad via a linkage 506. Likewise, when disengaged (such as in FIG. 5B), the control groove 528 is coincident with the post 504 so that the post 504 can move past the control element 510. The post 504 may move (for example, via a post spring 514) until the control element 510 coincides with one of the post grooves 520, at which point the control element spring 522 biases the control element 510 toward the engaged state.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An adjustable armrest comprising:
   an arm pad deck;
   a post connected to the arm pad deck, the post defining a plurality of post grooves;
   a linkage connected to the arm pad deck; and
   a locking mechanism,
   wherein:
      the linkage defines a tilt angle of the arm deck as a function of a vertical position of the post; and
      each post groove corresponds to a vertical position of the post with respect to the locking mechanism.

2. The adjustable armrest of claim 1, wherein:
   the post is pivotably connected to the arm pad deck at a posterior portion; and
   the linkage is connected to the arm pad deck at an anterior portion.

3. The adjustable armrest of claim 2, wherein the linkage is pivotably connected to the locking mechanism.

4. The adjustable armrest of claim 1, wherein the locking mechanism includes a single control element configured to releasably engage one of the plurality of post grooves.

5. The adjustable armrest of claim 4, wherein:
the single control element defines a control groove; and
the locking mechanism defines an engaged state and a disengaged state, the engaged state corresponding to the single control element disposed such that at least a portion of the single control element engages one of the plurality of post grooves, and the disengaged state corresponding to the single control element disposed such that the control groove is coincident with the post so that the post is allowed to translate vertically.

6. The adjustable armrest of claim 1, further comprising a post spring configured to bias the post upward.

7. A sidestick control armrest comprising:
an arm pad deck;
a post connected to the arm pad deck, the post defining a plurality of post grooves;
a linkage connected to the arm pad deck; and
a locking mechanism,
wherein:
the linkage defines a tilt angle of the arm deck as a function of a vertical position of the post; and
each post groove corresponds to a vertical position of the post with respect to the locking mechanism.

8. The sidestick control armrest of claim 7, wherein:
the post is pivotably connected to the arm pad deck at a posterior portion; and
the linkage is connected to the arm pad deck at an anterior portion.

9. The sidestick control armrest of claim 8, wherein the linkage is pivotably connected to the locking mechanism.

10. The sidestick control armrest of claim 7, wherein the locking mechanism includes a single control element configured to releasably engage one of the plurality of post grooves.

11. The sidestick control armrest of claim 10, wherein:
the single control element defines a control groove; and
the locking mechanism defines an engaged state and a disengaged state, the engaged state corresponding to the single control element disposed such that at least a portion of the single control element engages one of the plurality of post grooves, and the disengaged state corresponding to the single control element disposed such that the control groove is coincident with the post so that the post is allowed to translate vertically.

12. The sidestick control armrest of claim 7, further comprising a post spring configured to bias the post upward.

13. A system comprising:
an arm pad deck;
a post connected to the arm pad deck defining a plurality of post grooves, each corresponding to a vertical position of the post;
a linkage connected to the arm pad deck; and
a locking mechanism comprising:
a single control element configured to releasably engage one of the post grooves,
wherein:
the linkage defines a tilt angle of the arm deck as a function of a vertical position of the post.

14. The system of claim 13, wherein:
the post is pivotably connected to the arm pad deck at a posterior portion; and
the linkage is connected to the arm pad deck at an anterior portion.

15. The system of claim 14, wherein the linkage is pivotably connected to the locking mechanism.

16. The system of claim 13, wherein:
the single control element defines a control groove; and
the locking mechanism defines an engaged state and a disengaged state, the engaged state corresponding to the single control element disposed such that at least a portion of the single control element engages one of the plurality of post grooves, and the disengaged state corresponding to the single control element disposed such that the control groove is coincident with the post so that the post is allowed to translate vertically.

17. The system of claim 16, wherein the locking mechanism further comprises a control spring configured to bias the single control element into the engaged state.

18. The system of claim 13, further comprising a post spring configured to bias the post upward.

\* \* \* \* \*